United States Patent

Lewis et al.

[15] 3,658,417
[45] Apr. 25, 1972

[54] CONTACT PRINTING APPARATUS AND METHOD

[72] Inventors: Robert E. Lewis, Palo Alto; Melvin D. Wright, San Jose, both of Calif.
[73] Assignee: Teledyne, Inc., Hawthorne, Calif.

[22] Filed: June 11, 1970
[21] Appl. No.: 45,361

[52] U.S. Cl. ....................355/94, 248/363, 355/87
[51] Int. Cl. ....................G03b 27/20
[58] Field of Search ....................355/94, 91, 87, 73, 76; 248/363

[56] References Cited

UNITED STATES PATENTS 3,455,634 7/1969 Guffon ....................355/91
1,312,289 8/1919 Wenderhold ....................355/83

*Primary Examiner*—Samuel S. Matthews
*Assistant Examiner*—Richard L. Moses
*Attorney*—Flehr, Hohbach, Test, Albritton & Herbert

[57] ABSTRACT

Contact printing apparatus and method for directing light through a master plate onto a photosensitive plate. The two plates which may be of the same or different sizes, are placed into an exposure frame and a vacuum is applied to a peripheral portion of the plates while atmospheric pressure is maintained on the outside surface of both plates to force the plates into intimate contact.

24 Claims, 5 Drawing Figures

INVENTORS
ROBERT E. LEWIS
MELVIN D. WRIGHT
BY Flehr, Hohbach, Test, Albritton & Herbert
ATTORNEYS

INVENTORS
ROBERT E. LEWIS
MELVIN D. WRIGHT

BY Fehr, Hohbach, Test, Albritton & Herbert
ATTORNEYS

INVENTORS
ROBERT E. LEWIS
MELVIN D. WRIGHT
BY Fishe, Hohbach, Test, Albritton & Herbert
ATTORNEYS

CONTACT PRINTING APPARATUS AND METHOD

BACKGROUND OF THE INVENTION

This invention relates to contact printing and more particularly to precision microphotographic contact printing apparatus and methods useful in semiconductor device fabrication.

Generally, the precision required for reproducible results in the making of masks for use in semiconductor device fabrication forces one to operate near the technical limits of microphotographic contact printing technique. Microphotographic duplicates are commonly the product of exposure of a suitable emulsion or photo resist on a glass plate (herein, a photosensitive plate) to light while in contact with a master plate or negative bearing an image to be reproduced. In the final application of the resultant microphotomask product to semiconductor device fabrication it is common to design and use a number of geometrical patterns on successive masks which are printed successively in registry on the semiconductor wafer. To achieve effective registration between successive masks, it is found that the flatness quality of the glass used as the emulsion substrate is of considerable importance. If it lacks flatness to a sufficient degree, Newton's rings will appear between the photosensitive and master plates. These rings represent changes in transmitted light which affect the degree of exposure of the emulsion. Other detrimental effects to precision work include occasionally overhanging edges which cause bending as contact pressure is applied and results in a lack of flushness between the photosensitive and master plates. Furthermore, dirt, scratches, uneven mechanical pressure and the relief-like nature of the master plate can cause improper contact. Even under ideal conditions, proper mating is often prevented by entrapped gas which can remain between the plates. All of the aforementioned factors of faulty contact between the photosensitive and master plates contribute to refraction, diffraction, and Newton's rings with a resultant lack of image sharpness. There is, therefore, a need for an improved microphotographic printing apparatus and method.

SUMMARY OF THE INVENTION AND OBJECTS

In general, it is an object of the present invention to provide a contact printing apparatus and method which will overcome the above limitations and disadvantages.

Another object of the invention is to provide a contact printer, printing apparatus and method of the above character which is particularly suitable for precision microphotographic contact printing from a master plate onto a photosensitive plate for use of the latter as a semiconductor mask.

Another object of the invention is to provide an apparatus and method of the above character in which entrapped air or other gas is thoroughly removed from between the plates and other causes of faulty contact are eliminated.

Another object of the invention is to provide an apparatus and method of the above character which inherently provide for uniform illumination of the emulsion and which prevent variable illumination from any cause including optical imperfections in the system, and the formation of Newton's rings.

Another object of the invention is to provide a particularly suitable vacuum sealing frame for use in microphotographic contact printing which achieves uniform contact between the plates throughout their area of contact.

Another object of the invention is to provide an apparatus of the above character which is suitable for permitting the printing of plates having overlapping edges.

These and other objects of the invention will become apparent from the following description when taken in conjunction with the accompanying drawings.

In accordance with the above objects, a contact printing method and apparatus has been provided in which intimate contact is established between a master plate and a photosensitive plate. The method steps include (a) placing the master plate and photosensitive plate into contact with each other, (b) maintaining atmospheric pressure at the outer surfaces of the plates and simultaneously applying a vacuum through an area in common between the plates to squeeze the same into intimate contact, (c) maintaining the vacuum for a predetermined period of time (e.g., about 5 to 40 seconds) adequate to allow for outgassing of the space between the plates, and then (d) directing light through the master plate to expose the photosensitive plate. When the photosensitive and master plates are of the same size, the plate edges are aligned and a vacuum is drawn at the edges. When the two plates are of different sizes, the vacuum is applied at the edges of the smaller plate and at the front or rear surface of the larger plate in the vicinity of said edges. For plates of different sizes, the smaller plate is placed into contact with a central portion of the larger plate and a narrow annular vacuum sealed chamber is formed about the perimeter of the smaller plate open to an annular area of the larger plate.

To carry out the foregoing method, a precision optical contact printer is employed including a light source, means for controlling the light source, and an exposure frame. One embodiment of an exposure frame, which may be used where the master plate and photosensitive plate are of the same size, includes means for carrying the two plates in face-to-face contiguous relation in intimate contact with each other and means for establishing a vacuum sealed chamber in the region surrounding the master plate and photosensitive plate which includes portions of the frame for surrounding the peripheral of the plates. Duct means communicate with the thus formed chamber. Means for selectively connecting a vacuum pump to the duct means are provided so that, with the sealed chamber under vacuum, atmospheric pressure compresses against the outer faces of the master plate and photosensitive plate to obtain uniform contact therebetween. The aforementioned sealing means may include a plurality of passages formed in the carrying means which passages are interconnected at their outer ends to the vacuum source and terminate at their other ends in recesses positioned adjacent said chamber. The exposure frame may include means for defining a positioning limit about the perimeter of the master plate to limit lateral movement.

In the overall contact printer arrangement, means may be provided for controlling the exposure of the light source to the photosensitive plate. Furthermore, delay means may be associated with the means for selectively connecting a vacuum pump to the light exposure controlling means for beginning the exposure a predetermined time after the vacuum has been applied to thereby allow for adequate diffusion and outgassing of the region between the plates.

When it is desired to use two or more exposure frames, means may be provided for mounting the exposure frames in spaced relationship along an arc centered generally at the light source. A vacuum switch means (e.g., a manually operated switching valve) would be associated with each of the frames for selectively operating the same.

In order to accommodate different sizes for the photosensitive and master plates, another embodiment of the exposure frame may be employed including a base frame for carrying the larger plate and a subframe pivotally mounted on the base frame to carry the smaller plate and place the same into intimate contact with a central portion of the larger plate. A first sealing gasket means is disposed between the subframe and a surface of the larger plate bordering the edges of the smaller plate. Annular wall means disposed adjacent to and closely spaced apart from an internal face of the subframe is provided to form an annular chamber with the subframe. The wall means is movable to a position adjacent the outer peripheral margin of the smaller plate. A second gasket means is provided to form a seal between the wall means and the smaller plate. Duct means in the subframe communicate with the chamber and with a vacuum pump. The first and second gaskets form a seal for maintaining the annular chamber under vacuum so that the atmospheric pressure compresses against the outer faces of the master plate and photosensitive plate to form uniform contact therebetween. The above wall means may be pivotally mounted to the subframe and may include a sheet portion extending across the wall means spaced apart from the smaller plate to form an enclosure. Selective means for drawing a vacuum in said enclosure may be provided for positioning the smaller plate and for releasing the vacuum to atmospheric pressure for printing. A third sealing gasket means may extend between the wall means and the subframe to form a vacuum seal for the annular chamber.

DETAILED DESCRIPTION OF THE PREFERRED EMBODIMENTS

Figure 1:
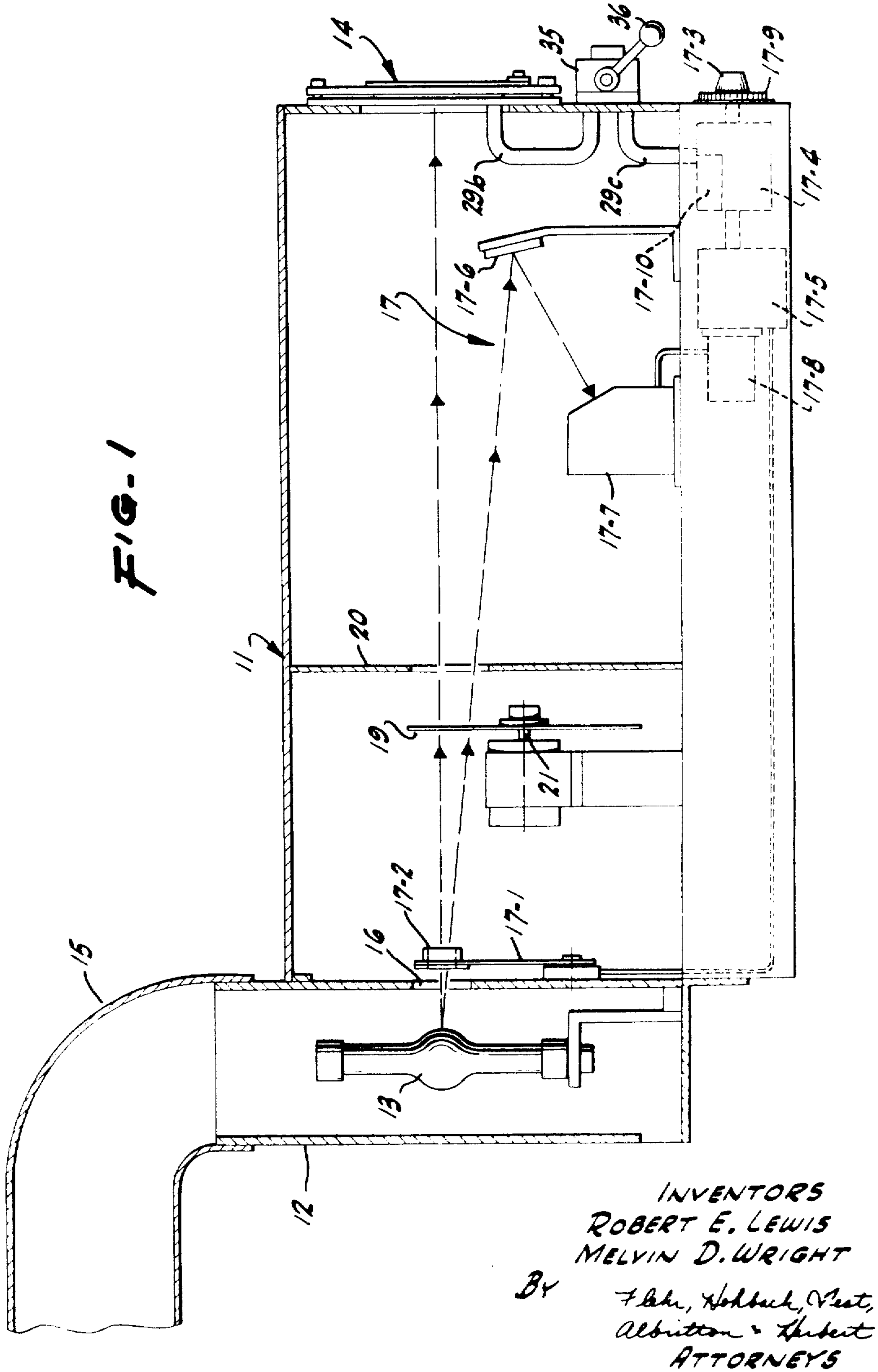
FIG. 1 is a schematic view partially in section of the contact printer in accordance with the present invention.

Referring particularly to FIG. 1 there is shown a contact printer constructed in accordance with the present invention to include generally rectangular framework 11 enclosed on all sides with light-tight walls. At one end of the framework there is disposed a lamphouse 12 in which is mounted a suitable light source, such as lamp 13 of the high pressure mercury or xenon arc or zirconium point arc type which is connected to a conventional power supply not shown. At the end opposite the lamphouse is disposed at least one exposure frame 14, described in detail hereinafter. Means such as a suitable fan, not shown, is provided for exhausting from within the lamphouse ozone, heated air, fumes, and particles upon breakage of the lamp through an exhaust flue 15. An aperture 16 is provided in the back wall for admitting the light from the lamp to define an optical axis from the lamp to the other end of the housing.

A light exposure control circuit 17 is provided to control the timing to begin exposure and the total quantity of light which impinges upon the photosensitive plate regardless of the output of lamp 13. The assembly includes a semaphore shutter 17–1 mounted so that it can be swung in place in front of the aperture or swung away, preferably by means consisting of a rotary solenoid. The shutter carries a red or other non-actinic filter 17–2 so that, with the filter in front of the aperture, light energy from the same lamp in an energized state, that would otherwise expose an emulsion, can be absorbed and filtered out. The shutter 17–2 and filter 17–2 also serve generally to close the lamphouse aperture and thereby reduce thermal currents during nonexposure periods. In this way, thermal currents which would otherwise produce schlieren within the housing together with the resulting degradation of light uniformity along the optical axis of the system are reduced.

Means is provided for processing the light emanated from lamp 13 and consists of an optical filter 19 which controls the printing wave length band-pass. A baffle 20 may be interposed which, along with the filter, generally subdivides the interior of the housing into a first region or volume associated with the lamp housing and a second volume which is isolated from the housing by the baffle and filter. In this way, thermal air currents and resulting schlieren are confined to a smaller volume and can be more readily controlled. Use of a light source subtending any appreciable angle will produce a penumbra in the exposure due to the angle subtended by the light source as viewed by the negative. Therefore, it is desirable that the light source itself be as small as possible to achieve optimum resolution in the printed copy. For this purpose laser may be used as lamp 13 together with suitable optics for expansion or divergence of the beam.

Hazy coatings and optical defects which routinely occur on filter 19 can produce forward scattering diffraction patterns and uneven exposure on the photocopy. In order to time integrate such spurious spatial effects, means are provided consisting of a mounting system for maintaining filter 19 in constant movement during exposure. One suitable time integration system consists of providing a filter having a disc-like shape and carried on a small motor driven pin 21 so that the filter is continuously rotated in the path of the light beam from the lamp 13. It would be possible to utilize other systems for moving filter 19 in a manner such that any imperfections therein are averaged out. Similarly, if a laser light source were used as lamp 13, any expansion optics required to provide adequate beam area should also be provided with means for constantly moving such optics to provide time integration of any imperfections whether inherent (e.g., lens defects) or external (e.g., dust and the like). Such means effectively control and eliminate the uneven light exposure caused by such defects.

VACUUM FRAME

Exposure frame 14 generally consists of means for carrying a photosensitive plate 22 and a master plate 23 in face-to-face contiguous relation in intimate contact with each other, and for defining a positioning limit about the perimeter of each of said plates to prevent lateral movement in the plane thereof. Such means consist of a metal plate 24 having a cut out area or opening 25 in generally rectangular form for admitting plates 22 and 23. The opening is relieved at its corners to permit free flow of gases thereabout and to facilitate manual access to the plates. The opening is also provided with lateral edges 26 for contacting the edges of the plates disposed therein. Preferably the opening 25 and edges 26 are oriented so that, with frame 14 in an upright operative position, a generally square conformation of the master plate and photosensitive plate is formed. This is accomplished since one corner of the plates points downwardly and so under the influence of gravity the plates lie against the two lower sides of the positioning limits provided by said opening.

Means is further provided for establishing a generally planar rim for supporting the inwardly directed face of said master plate about the peripheral margin thereof. Such means includes sealing means consisting of a vacuum-tight flexible gasket 27 having a rectangular opening therein slightly smaller than the opening in said positioning limit means and so oriented that a closed loop is formed about the master plate immediately interiorly of said positioning limit. The thus formed loop has an outwardly facing sealing edge for contacting all portions of the peripheral margin of said master plate and for establishing a vacuum seal therewith. Additionally, means is provided for supporting the flexible sealing means just described and consists of an additional marginal plate 28 having a rigid bearing surface 28*a* extending contiguously with all portions of the gasket and particularly in the areas immediately opposed to the areas being sealed by the gasket to the master plate.

Means is provided for establishing a vacuum sealed chamber about plates 22 and 23 and generally consists of suitable ducts 29 formed in the positioning plate whereby a vacuum can be drawn from at least one and preferably several positions at the perimeter of said plates through vacuum channel 29*a*. Such means further includes a flexible flap 30 for sealing the rear surface of the positioning plate. The flap may be connected to the positioning plate by a suitable strap 31 along a line lying below the opening for receiving the plates. The flap is large enough to cover the entire area of the opening and the surrounding surface of the positioning plate 24. Means for temporarily holding the flap in an upward position against the surface of the positioning plate may be provided such as a pressure sensitive sticky surface 32 above the opening to which the flap adheres when pressed. Alternatively, magnetic elements may be employed as the temporary holding means. Subsequently, as the vacuum is drawn, there is no further purpose for the temporary holding means. Also associated with the frame is means for providing a light trap periphery about said opening on that side facing the light source which consists of a series of steps 34 positioned about the aperture rim of plate 28 and generally opening toward the light source.

Exposure frame 14 can be formed either integrally as part of the printer assembly, or can be manufactured of separately fastened plates adapted to be attached to the front face of the printer assembly by suitable mounting screws.

A vacuum pump (not shown) is provided for the printer and is connected interiorly through the light box plate and support plate by vacuum lines 29*b* and 29*c* to channel 29*a* for drawing a vacuum on the periphery of said frame in the area between the gasket 27 and the flap 30. Suitable means such as a valve 35 actuated by knob 36 is employed to draw and release the vacuum.

The material of flap 30 and gasket 27 should be capable of holding a vacuum and establishing a vacuum seal against a plate surface and sufficiently flexible to permit a slight mechanical shift of plates as a vacuum is applied. Suitable materials include various types of natural or synthetic rubbers.

In operation, a master plate containing a design is positioned against the gasket 27 and is supported about its peripheral margin by the same gasket. A photosensitive plate is positioned so that one face is contiguous with and immediately behind a facing surface of master plate in such a fashion that both plates bear against the lowermost surfaces 26 of the positioning plate 24. The outer flap 30 is then pushed up and contact made with the adhesive holding means for temporarily retaining the plates and the flap in the proper position. Means are provided for controlling the vacuum applied within the exposure frame which may include suitable piping and valve. The valve is then operated to draw a vacuum about the edges of plates 22 and 23 to bring the same into increasingly intimate contact.

A vacuum seal is formed over the entire peripheral margin of the master plate 22 by he gasket 27. Likewise, the outerflap 30 is pulled by the vacuum into intimate contact with the back surface of the photosensitive plate 23 and a vacuum is drawn about at least a periphery of the rear surface of the photosensitive plate in a similar manner. As will be discussed, the vacuum is maintained for a predetermined period of time to assure the existence of intimate contact between the plates and adequate outgassing. After the vacuum has been maintained for that period of time, the forces on the plates consist solely of uniform atmospheric pressure over the area of both plates. And the only mechanism contact remaining is at the peripheral margin of the front face of the master plate which lies in contact against the overlapping surface of the gasket. The entire rear surface of the photosensitive plate is covered by flap 30, the periphery of which is sufficiently flexible that adjustment in the positioning of the plates, gasket and flap can take place. The back flap itself is sealed against the rear surface of the positioning plate and throughout all regions immediately surrounding the aperture. In this position, the vacuum seal is generally formed in the separation between the gasket and flap immediately adjacent the perimeters of the two plates and thereafter the plates are subjected to atmospheric pressure. The pressure is uniformly applied directly to the substantially open portion of the front face of the master plate while it is applied through the flexible flap 30 to the rear face of the photosensitive plate. Thus, aside from the periphery, the entire front surface of the master plate as well as the entire rear surface of the photosensitive plate are subjected to atmospheric pressure, while the periphery of these plates as well as the edges are subjected to a vacuum. Because the plates rest under gravity against common lower positioning limits 26 on at least two sides, there is no possibility of an overlapping of the edges of the plates at that side and any overlap which occurs at the other edges is the result of inadequate size control of the plates. Close size control is not difficult to attain. As so positioned, the plates are in extremely intimate contact by the uniform application of atmospheric pressure against the outer surfaces. It will be noted that no mechanical pressure per se is exerted on the plates other than by the direct application of atmospheric pressure.

When a vacuum is applied in the above described frame, an effective vacuum seal in region 26 is formed primarily in the areas denoted as *a*, *b* and *c* of flap 30 and gasket 27.

In general, the operation of the contact printer of the present invention is straightforward. The sealing flap 30 is pulled away from the tacky adhesive surface 32 to thereby expose the aperture and positioning limit 26 of the vacuum frame. The master plate 22 is then placed in the frame with the surface carrying information facing rearwardly toward the operator. The photosensitive plate 23 is then placed immediately rearwardly of the master plate and the flap returned to its position against the tacky surface. The vacuum is then drawn.

Time delay means is provided to delay actuation of shutter 17 away from aperture 16 to expose the photosensitive plate until outgassing between plates is substantially complete. This is necessary because there are large numbers of geometrical shapes to be printed in which there are closed rings which are capable of entrapping gases and so a vacuum is held for a sufficient period of time so that the entrapped gas can be outgassed and diffuse away from the regions. It is found that a time of from 5 to 180 seconds, generally, will suffice for permitting proper diffusion and outgassing of such gases. Therefore, the time delay means forms a portion of the light exposure control assembly and includes the timer dial 17–3 which controls timer 17–4 to establish the delay prior to exposure. The timer actuates shutter control switch 17–5 to pivot shutter 17–1 away from aperture 16. The operator will have set a timer so that this time is established before the beginning of the exposure cycle.

Timer 17–4 is actuated by vacuum sensing switch 17–10 only after a sufficiently low pressure is created within frame 14 to begin the effective removal of entrapped gases between the photosensitive and master plates. Switch 17–10, connected to line 29*c*, starts timer 17–4 when the pressure in line 29*c*, and thus 29*b*, falls below a predetermined value for removing entrapped gases. Thus excellent plate contact is made even if there were a malfunction in the seals, valves or vacuum pump. A pulled vacuum level of from about 22 to 25 inches of mercury has been found to be effective to remove the entrapped gases.

The time required for complete exposure of a photosensitive plate depends somewhat upon the particular type of photosensitive material used. Thin film resist of the type manufactured under the trademark "KTFR" by Eastman Kodak is found to take much more exposure than, for example, a positive resist of the type manufactured under the trademark "AZ1350" by Azoplate Corp. Variable watt-second exposure values are also obtained for microphotomask plates such as high resolution silver halides of the Lippman type manufactured by Eastman Kodak and see-through dye types as manufactured under the trademark "Microline" by GAF Corp. However, these time determining factors can be observed in the results on the finished masks and after one operation with a particular geometrical pattern and a particular photosensitive material, the correct timing is a reproducible factor. As shown in FIG.. 1, upon starting exposure, a portion of the light impinges upon and is reflected by a suitable mirror 17–6 to be directed to photocell 17–7 the output of which is integrated during frame exposure by integrating circuit 17–8 which is operatively associated with shutter control switch 17–5. Mirror 17–6 may be eliminated by direct photocell exposure to lamp 13 or by scattering light from a light target. When the output in watt seconds reaches a predetermined value set by a watt second adjust dial 17–9, switch 17–5 actuates shutter 17–1 to a closed position. Alternatively, the integrating circuit 17–8 could de-energize the lamp 13. The exposure can be controlled to a very precise degree since the effects of variations in light voltage, lamp age, temperature and other variables are eliminated. After exposure, an automatic vacuum release may be provided or the valve connecting the frame to the vacuum line merely closed.

The aforementioned principles of applying atmospheric pressure to the outer plate faces after drawing a vacuum can be utilized in the construction of another exposure frame 37 which will accommodate contact printing with plates of entirely different sizes. By using exposure frame 37, a vacuum seal may be established on that surface only of the larger plate 39 which is forced toward the smaller plate 38 rather than on the outer surfaces of each plate as shown with reference to FIGS. 2 and 3. Such an arrangement is disclosed in FIGS. 4 and 5 and consists generally of a base frame 40 which is mounted in an upright position over an aperture of printing assembly. First and second subframes 42 and 49, respectively, are attached to the base frame by hinges 43 and 50, respectively, which serve only to support the subframes and to permit their general movement toward and away from the base frame. The first subframe is adapted to carry the larger of the two plates which may be either a photosensitive plate or a master plate, such as a 4 × 5 inch plate commonly used in photographic processes.

The fixed base frame 40 carries an interchangeable plate 41 which supports a substantial peripheral margin of plate 39. Plate 41 includes an aperture which defines the limits of exposure for the rest of the system with the front surface of frame 40 facing the light source and permits selection of varying sizes of printed areas. Front and rear surfaces are defined herein as surfaces, respectively, facing toward or away from the light source.

A first subframe 42 is pivotally mounted by hinge 43 along one edge of base frame 40 and is adapted to move toward and away from the base frame for access to the rear face of the latter. Subframe 42 includes a member 44 which defines at its lateral edges 45 a positioning limit for the perimeter of plate 39. Subframe 42 is provided with one or a plurality of ducts 46 in recesses positioned adjacent to edges 45 and adapted to be interconnected at their outer ends 45*a* to a vacuum source by means of valve 60*a* for drawing a vacuum in region 47. A sealing gasket 48 for such vacuum is provided on the central portion of the front surface of member 44 for contact with the rear surface of plate 39.

Latch means is provided for retaining subframe 42 against base frame 40 and may include a vacuum duct 59 between the two frames. When a vacuum is drawn, subframe 49 is held in an upright position against base frame 42. Any conventional mechanical latch may also be used.

A second subframe 49 to carry plate 38 is shown removably, pivotally mounted by hinge 50 onto subframe 42 for independent movement relative to the latter and for interchangeability to accommodate plates 39 of varying sizes. Alternatively, a common hinge could be employed for subframes 42 and 49 with the result that subframe 49 would be directly mounted to base frame 40. Subframe 49 includes a window 51 in the central opening thereof and extending framing walls 52 at the periphery of the window. A first gasket 53 is carried by walls 52 and serves to contact smaller plate 38. Subframe 49 also includes a second gasket 54 which contacts the rear surface of member 44. Gasket 54 is flexible and permits freedom of movement of subframe 49 toward and away from subframe 42 so that atmospheric pressure alone is responsible for contact between the plates upon drawing a vacuum in region 47. Subframe 49 is further provided with positioning limiting rails 55 suitably mounted on walls 52 which may be oriented in a similar manner to lateral edges 45 of subframe 42 for the same purpose.

Gaskets 48, 53 and 54 should have the properties discussed with respect to gasket 27.

Subframes 42 and 49 cooperate to define a chamber 56 bounded by window 51 and framing walls 52 and adapted to be enclosed by plate 38 when in operative placement. Subframe 49 is further provided with duct 57 communicating at its outer end with valve 60*c* and a vacuum source and at its inner end with chamber 56 and, accordingly, with the rear surface of the plate 38.

In operation of the exposure frame, a large master plate 39 is selected and inserted within the first subframe 42 by pivoting the same away from base frame 40 and inserting a master plate against the position limiting edges 45. Thereafter subframe 42 is moved to a closed position with base frame 40. Subframe 49 is pivoted away from the first subframe 42 and the photosensitive plate 38 to be printed is positioned therein against position limit rails 55. A vacuum is drawn in chamber 56 through duct 57 by vacuum pump means controlled by valve 60*c* for the purpose of retaining plate 39 in a fixed position against subframe 49 which is then pivoted to a closed position against frame 40 and subframe 42. Thereafter, a vacuum is drawn within region 47 by the same or other suitable vacuum pump means connected to ducts 46. Then plate 38 is held in position by rails 55 and plate 39 and so the vacuum in chamber 56 may be relieved to the atmosphere by opening valve 60*c*.

Figures 2, 3:
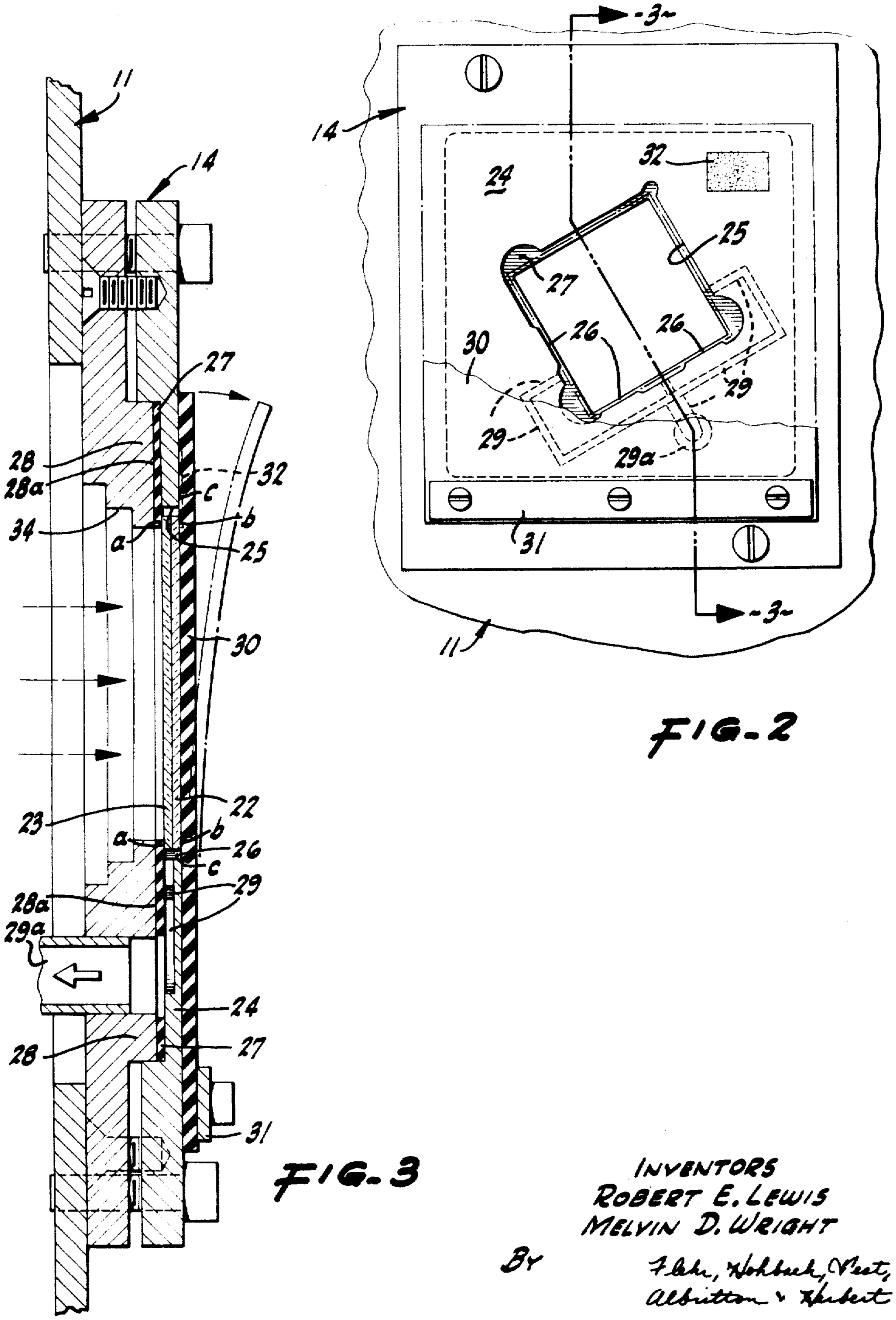
FIG. 2 is an end view partially in section of one embodiment of an exposure frame portion of the printer of FIG. 1.
FIG. 3 is a cross-sectional view of FIG. 2 taken along the line 3—3.
Figures 4, 5:
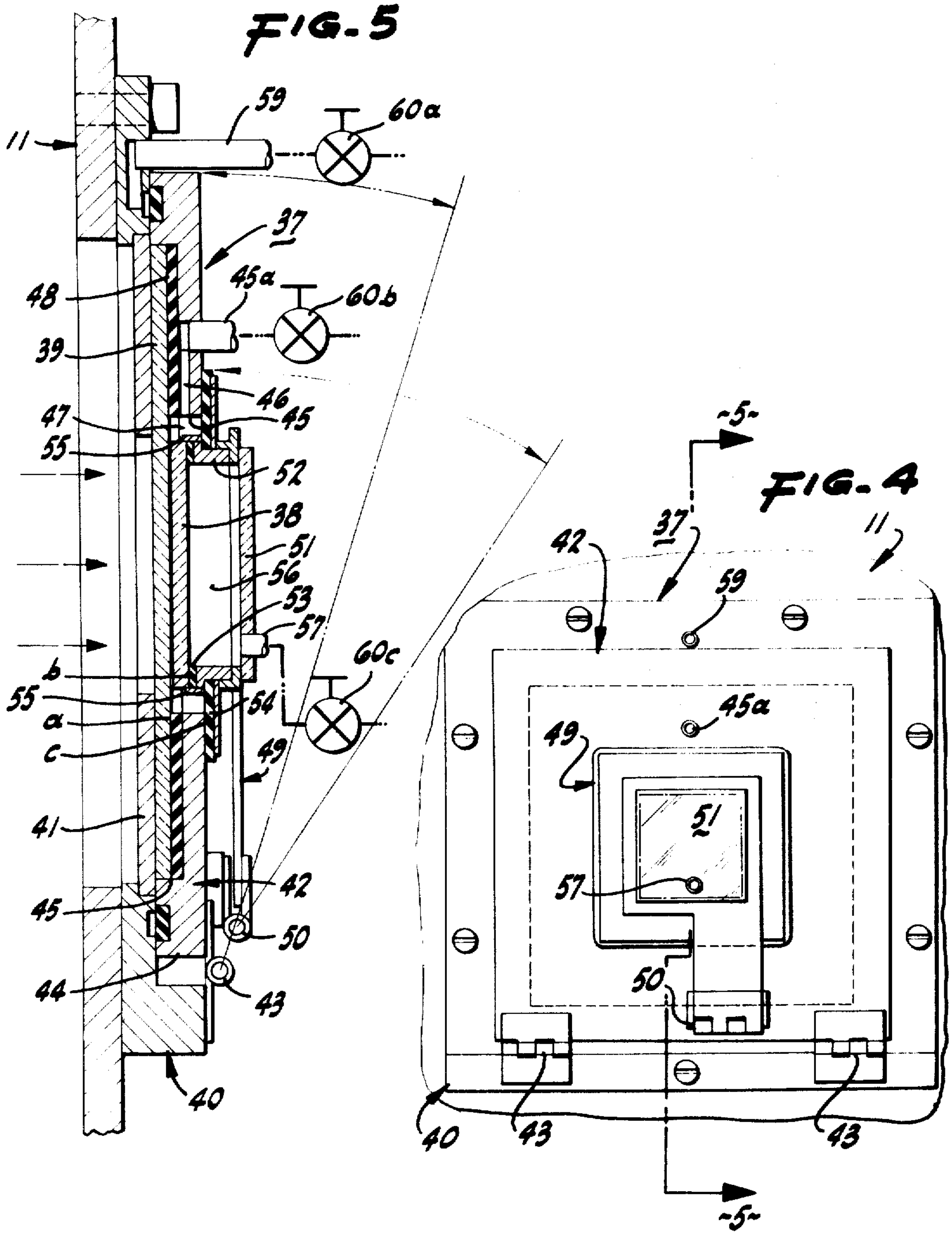
FIG. 4 is an end view of another embodiment of an exposure frame.
FIG. 5 is a cross-sectional view of FIG 4 taken along the line 5—5.

Referring to FIG. 5, an effective vacuum seal in region 47 is formed primarily in the areas denoted as *a*, *b* and *c* of gaskets 48, 53, and 54, respectively, functionally corresponding to areas *a*, *b* and *c* of FIG. 3. The remaining portion of such gaskets provide a small portion of the seal. In this manner, the perimeter of plates 38 and 39 is retained under vacuum while atmospheric pressure is applied to the external faces of the same to force the plates into intimate contact. Thus, uniform contact pressure is provided over the entire image area.

It is noted that the only substantial pressure that is applied to larger plate 39 is in area *b* which is located in a close lateral position to area *c* whereat pressure is applied against smaller plate 38. Thus, only a minor, if any, differential bending movement between the two plates is created which does not interfere with the intimacy of contact. In this manner, contact printing between two plates of different sizes may be accomplished without the application of substantial uneven forces which tend to bend one plate relative to the other to produce uneven contact. Therefore, contact is complete and uniform for exposure frames of the general type designated as 14 or 37. The overall principles of operation are the same. For each element of the seal established on the photosensitive plate there is a corresponding gasket element sealing against an adjacent portion of the master plate whether on the front or rear surface thereof. Together these elements integrate to form closed sealing loops generally facing each other along their respective portions and aligned in correspondence with each other to cover substantially equal area of the plates.

It is noted that exposure frame 37 has been described by employing the larger plate as the master plate, exposed to the light, and the smaller plate as the photosensitive plate. The relative plate sizing may be reversed by removing the window 51 from second subframe 49, after establishment of a vacuum in chamber 56, thereby exposing a smaller master plate to the light source.

To those skilled in the art to which this invention relates, many other modifications and adaptations of the invention will suggest themselves. For example, another embodiment incorporating the aforementioned principles of atmospheric compression at the external faces of a master plate and photosensitive plate includes a supporting bag means into which both plates are placed. The bag means includes two sheets sealed at their perimeter and having one or more openings for admitting one or more vacuum lines. Suitable bags are formed of flexible materials such as mylar, polyethylene or other polymers. The bag is preferably of transparent or translucent nature to facilitate manipulation of the plates. The two plates are inserted in the bag means and a vacuum is drawn after a short period of time. A sealing rim will be found to have been established between the bag and the plate about the periphery of each of the outwardly facing surfaces of the plate and a vacuum is drawn on the region of contact between the plates which, if held for the aforementioned period of time, is adequate to produce a satisfactory contact between the plates by using atmospheric pressure pushing on their outwardly facing surfaces. After establishment of intimate contact, an aperture on the master plate side for light projection is cut into the bag leaving a marginal peripheral bag portion bordering the aperture. After exposure the bag may be removed from the plate.

Referring to FIG. 5, another modification would be to position gasket 48 below larger plate 39 to form a vacuum seal c with the lower surface of plate 39 in a manner analogous to the embodiment of FIG. 3. Two or more exposure frames may be mounted onto the contact printer to utilize the same for multiple printing. To do so, the frames would be positioned in spaced relationship along an arc centered generally along said light source. Vacuum switch means would be associated with each frame for selective operation.

Accordingly, it will be understood that the disclosures and examples specifically set forth herein are not to be taken in a limiting sense, but are to be understood as examples of the practice of the present invention and many other embodiments will be understood to fall within the scope of the present invention.

We claim:

1. In a precision optical contact printer for exposing a planar photosensitive plate to an image borne on a master plate, a light source, means for controlling the output of said light source, an exposure frame including means for carrying said photosensitive plate and said master plate in face-to-face contiguous relation in intimate contact with each other, said exposure frame defining a central opening, means for establishing a vacuum sealed chamber in the region surrounding said master plate and said photosensitive plate and including portions of said frame for surrounding the peripheral margin of the plates, duct means communicating with said chamber, means for selectively connecting a vacuum pump to said duct means so that, with said sealed chamber under vacuum, atmospheric pressure compresses against both the outer face of said photosensitive plate and directly through said opening against said master plate to obtain uniform contact therebetween and so that the surface of the master plate in registry with said opening is unobstructedly exposed to the atmosphere.

2. A contact printer as in claim 1 including means for defining a positioning limit about the perimeter of said master plate and photosensitive plate to limit lateral movement thereof.

3. A contact printer as in claim 1 in which said vacuum chamber sealing means consists of a plurality of passages formed in said carrying means, the passages being interconnected at their outer end to said vacuum source and terminating at their other end in recesses positioned adjacent said chamber.

4. A contact printer as in claim 1 further including means for controlling the exposure of said light source to said photosensitive plate.

5. A contact printer as in claim 1 in which said carrying means consists of a flexible bag means surrounding said master and photosensitive plates and said means for establishing a vacuum includes an aperture in said bag means.

6. A contact printer as in claim 1 further including delay means associated with said means for selectively connecting a vacuum pump and said light exposure controlling means for beginning said exposure a predetermined period of time after said vacuum has been applied to thereby allow for adequate diffusion and outgassing of the region between said plates.

7. A contact printer as in claim 6 including wave length selective filter means rotatably mounted between said light source and said plates, and means for rotating said filter means.

8. A contact printer as in claim 6 in which said light exposure controlling means includes a shutter system actuated for movement away from said light source by said delay means.

9. A contact printer as in claim 8 in which said shutter system includes a non-actinic filter.

10. A contact printer as in claim 1 in which means are provided for directing the exhaust of fumes from the light source away from said contact printer.

11. In a precision optical contact printer for exposing a planar photosensitive plate to an image borne on a master plate, a light source, means for controlling the output of said light source, an exposure frame including means for carrying said photosensitive plate and said master plate in face-to-face contiguous relation in intimate contact with each other and means for defining a positioning limit about the perimeter of each of said plates to limit lateral movement thereof, means for establishing a generally planar gasket for supporting one face of said master plate about the peripheral margin thereof facing said light source, means associated with said gasket and said positioning limit means and adapted to cooperate with the adjacent rear surface of said photosensitive plate to establish a vacuum sealed chamber in the region surrounding said master plate and said photosensitive plate and including portions of said frame for surrounding the peripheral margin of the plates, duct means communicating with said surrounding frame portions and a flexible sealing flap for covering the rear of said frame, means for selectively connecting a vacuum pump to said duct means so that when a vacuum is drawn in the region of separation between said gasket and said flap is maintained at said vacuum pressure whereby the atmospheric pressure compresses against the outer faces of said master plate and said photosensitive plate to obtain uniform contact therebetween.

12. In a precision optical contact printer for exposing a planar photosensitive plate to an image borne on a master plate, said plates being of different planar sizes, a light source, means for controlling the output of said light source, an exposure frame including a base frame for carrying the larger plate and a subframe for carrying the smaller plate, means for pivotally mounting said subframe to said base frame to place the smaller plate in intimate face-to-face contact with a central portion of said larger plate, first sealing gasket means disposed between the subframe and a surface of the larger plate bordering the edges of the smaller plate, annular wall means disposed adjacent to and closely spaced apart from an internal face of said subframe to form an annular chamber therewith, said wall means being movable to a position adjacent the outer peripheral margin of the smaller plate and second gasket means forming a seal between said wall means and said smaller plate, duct means in said subframe communicating with said chamber, and means for selectively connecting a vacuum pump to said duct means so that when a vacuum is drawn said first and second gaskets form seals for maintaining said annular chamber under vacuum whereby the atmospheric pressure compresses against the outer faces of said master plate and said photosensitive plate to obtain uniform contact therebetween.

13. A contact printer as in claim 12 in which said larger plate is a master plate facing said light source.

14. A contact printer as in claim 12 in which said smaller plate is a master plate facing said light source.

15. A contact printer as in claim 12 in which said wall means pivotally mounted to said subframe and including sheet portion extends across said wall means spaced apart from said smaller plate to form an enclosure and selective means for drawing a vacuum in said enclosure for positioning said smaller plate and for releasing the vacuum to atmospheric pressure for printing.

16. A contact printer as in claim 8 including a third sealing gasket means extending between said wall means and said subframe and forming a vacuum seal for said annular chamber.

17. A method for establishing intimate contact between a master plate and a photosensitive plate comprising placing said master plate and said photosensitive plate into contact with each other, maintaining atmospheric pressure at the outer surfaces of said plates and simultaneously applying a vacuum throughout an area in common between said plates to squeeze the plates into intimate contact, maintaining said vacuum for a predetermined period of time adequate to allow for outgassing of the space between said plates, and then directing light through said master plate to expose the photosensitive plate so that at least a central portion of said master plate is directly exposed to the light.

18. A method as in claim 17 wherein the edges of the photosensitive and master plates are generally coincident and the vacuum is applied at said edges.

19. A method as in claim 17 wherein the master plate and photosensitive plate are of different sizes and the vacuum is applied at the edges of the smaller plate and at a surface of the larger plate in the vicinity of said edges.

20. A method as in claim 17 wherein said predetermined time period is from about 5 to 40 seconds.

21. A method for establishing intimate contact between a master plate and a photosensitive plate of larger and smaller size, comprising placing the face of said smaller plate onto a central portion of said larger plate, forming a narrow annular sealed chamber about the perimeter of said smaller plate open to an annular area of said larger plate, maintaining atmospheric pressure at the outer surfaces of said plates, and simultaneously applying a vacuum to said chamber to squeeze the plates into intimate contact maintaining said vacuum for a predetermined period of time to allow for outgassing between said plates, and then directing light through said master plate to expose the photosensitive plate.

22. In a method for contact printing by directing light from a source through a master plate onto a photosensitive plate, the steps of placing the master plate and photosensitive plate in contact with each other so that the master plate faces the light source but is substantially unexposed to developing light emitted therefrom, maintaining atmospheric pressure at the outer surfaces of said plates and simultaneously applying a vacuum throughout an area in common between said plates until said vacuum falls to a sufficiently low pressure to begin substantial outgassing between said plates, sensing said low pressure value, actuating an exposure delay timer in response to said sensing while maintaining the vacuum to thereby expose said plates to light from said source only after a predetermined period of time after said sensing for effectively complete outgassing between said plates, measuring by light sampling the total time integrated amount of exposure received by the plate, releasing the vacuum, and removing the exposed photosensitive plate.

23. A method for contact printing as in claim 18 in which said lighting is selectively filtered during exposure.

24. In a precision optical contact printer for exposing at least two planar photosensitive plates to images borne on two corresponding master plates, a light source, means for controlling the output of said light means, at least two exposure frames, means for mounting said exposure frames in spaced relation along an arc centered generally at said light source, each of said exposure means for carrying a set of said photosensitive plates and said master plates in face-to-face contiguous relation in intimate contact with each other, means for establishing a vacuum sealed chamber in the region surrounding each of said master plates and said photosensitive plates and including portions of said frames for surrounding the peripheral margin of the plates, duct means communicating with said chamber, means for selectively connecting a vacuum pump to said duct means so that with said sealed chamber under vacuum atmospheric pressure compresses against the outer faces of each of said master plates and said photosensitive plates to obtain uniform contact therebetween and vacuum switch means associated with each of said frames for selectively or non-selectively operating the same.

* * * * *